US011295197B2

(12) United States Patent
Murali et al.

(10) Patent No.: US 11,295,197 B2
(45) Date of Patent: Apr. 5, 2022

(54) FACILITATING EXTRACTION OF INDIVIDUAL CUSTOMER LEVEL RATIONALES UTILIZING DEEP LEARNING NEURAL NETWORKS COUPLED WITH INTERPRETABILITY-ORIENTED FEATURE ENGINEERING AND POST-PROCESSING

(71) Applicant: International Business Machines Corporation, Armonk, NY (US)

(72) Inventors: Pavankumar Murali, Elmsford, NY (US); Nianjun Zhou, Danbury, CT (US); Ta-Hsin Li, Danbury, CT (US); Pietro Mazzoleni, New York City, NY (US); Wesley Gifford, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 827 days.

(21) Appl. No.: 16/113,734

(22) Filed: Aug. 27, 2018

(65) Prior Publication Data

US 2020/0065645 A1    Feb. 27, 2020

(51) Int. Cl.
*G06N 3/04* (2006.01)
*G06Q 30/02* (2012.01)
*G06N 3/08* (2006.01)

(52) U.S. Cl.
CPC .............. *G06N 3/04* (2013.01); *G06N 3/08* (2013.01); *G06Q 30/0202* (2013.01)

(58) Field of Classification Search
CPC ......... G06N 3/04; G06N 3/08; G06Q 30/0202
See application file for complete search history.

(56) References Cited

U.S. PATENT DOCUMENTS 6,622,125 B1   9/2003   Cragun et al.
8,027,864 B2   9/2011   Gilbert
(Continued)

OTHER PUBLICATIONS

Lee et al., "Activity recognition with android phone using mixture-of-experts co-trained with labeled and unlabeled data", Available online Jul. 30, 2013, Neurocomputing vol. 126, pp. 106-115. (Year: 2013).*

(Continued)

*Primary Examiner* — Kamran Afshar
*Assistant Examiner* — Ying Yu Chen
(74) *Attorney, Agent, or Firm* — Amin, Turocy & Watson, LLP

(57) ABSTRACT

The disclosure relates to extraction of rationales for studied outcome. A method comprises: grouping features as expert to align with a set of operating practices; generating interpretable features using operating rules, combining with statistical dependence analysis to bin selected features to generate favorite practice actions; grouping features as expert that combine a subset of the interpretable features to align with a set of operating practices. The method can also comprise: using a neural network or deep learning component to quantify contribution of respective experts at a consumer level applying a generic additive approach; extracting feature importance at an individual consumer-level decomposed from expert level importance; evaluating alternative, what-if, scenarios through sensitivity analysis to identify favorite practice actions; consolidating a subset of the practice actions at client or stakeholder levels; and routing respective practice actions as a function of responsibility for the set of operating practices to stakeholders or consumers.

20 Claims, 8 Drawing Sheets

(56) References Cited

U.S. PATENT DOCUMENTS

| | | |
|---|---|---|
| 2005/0189415 A1 | 9/2005 | Fano et al. |
| 2006/0143071 A1 | 6/2006 | Hofmann |
| 2014/0279263 A1* | 9/2014 | Liu .................... G06Q 30/0627 705/26.63 |
| 2015/0025931 A1 | 1/2015 | Li et al. |
| 2017/0186041 A1 | 6/2017 | Li et al. |
| 2017/0243137 A1 | 8/2017 | Mandel et al. |
| 2017/0255945 A1 | 9/2017 | McCord et al. |
| 2017/0293836 A1 | 10/2017 | Li et al. |
| 2017/0293838 A1 | 10/2017 | Min |
| 2017/0316438 A1 | 11/2017 | Konig et al. |
| 2019/0138806 A1* | 5/2019 | Banerjee .............. G06K 9/6232 |

OTHER PUBLICATIONS

Fragos et al., "Classification of Decision-Behavior Patterns in Multivariate Computer Log Data Using Independent Component Analysis", 2003, KES 2003, LNAI 2774, pp. 73-79. (Year: 2003).*

Schwab et al., "Granger-causal Attentive Mixtures of Experts: Learning Important Features with Neural Networks", May 28, 2018, arXiv:1802.02195v2 [cs.LG], pp. 1-11. (Year: 2018).*

Zuo et al., "Using Statistical Learning Theory for Purchase Behavior Prediction via Direct Observation of In-store Behavior", 2015, 2015 2nd APWC on CSE, pp. 1-6. (Year: 2015).*

Khan et al., "Behavioral Modeling for Churn Prediction: Early Indicators and Accurate Predictors of Custom Defection and Loyalty", 2015, 2015 IEEE International Congress on Big Data, pp. 677-680. (Year: 2015).*

Pontes et al., "Design of experiments and focused grid search for neural network parameter optimization", Jan. 21, 2016, Neurocomputing vol. 186, pp. 22-34. (Year: 2016).*

Van Belle, et al., "Research directions in interpretable machine learning models," ESANN 2013 proceedings, European Symposium on Artificial Neural Networks, Computational Intelligence and Machine Learning. Bruges (Belgium), Apr. 24-26, 2013, 9 pages.

Dancho, "Customer Analytics: Using Deep Learning with Keras to Predict Customer Churn," Nov. 28, 2017, 51 pages.

Heckel, et al., "Scalable and interpretable product recommendations via overlapping co-clustering," 2017 IEEE 33rd International Conference on Data Engineering, 12 pages.

Anonymous, "An information theoretic approach for customer modeling," Publication Date: Jul. 20, 2002, 14 pages.

Lang, et al., "Understanding Consumer Behavior with Recurrent Neural Networks," Last Accessed: Apr. 5, 2018, 8 pages.

Li, et al., "Applying Data Mining Techniques to Direct Marketing: Challenges and Solutions," 2015 IEEE 15th International Conference on Data Mining Workshops, 9 pages.

Liu, et al., "Large Scale Cross Category Analysis of Consumer Review Content on Sales Conversion Leveraging Deep Learning," May 24, 2017, 48 pages.

Repetto, "Neural Networks: a Mixture of Experts with Attention," towardsdatascience.com https://towardsdatascience.com/neural-networks-a-mixture-of-experts-with-attention-30e196657065 [Accessed Dec. 1, 2017], 3 pages.

Santolaya, "Using recurrent neural networks to predict customer behavior from interaction data," 36 EC, Feb. 2017—Jul. 2017, 69 pages.

Urbanke, et al., "A Customized and Interpretable Deep Neural Network for High-Dimensional Business Data—Evidence from an E-Commerce Application," Thirty eighth International Conference on Information Systems, Seoul 2017, 18 pages.

Yin, et al., "Mining Effective Subsequences with Application in Marketing Attribution," 2016 IEEE 16th International Conference on Data Mining Workshops, 8 pages.

* cited by examiner

EXAMPLE OF MODEL OUTPUT

Prediction:

 The attention model predicts that as of March 28, 2017 client Jane Doe, who owns a small business, has a 87% likelihood (1st percentile) to purchase a VISA platinum credit card within the next 3 months

**Rationale*:**

| Attribute | Importance for Average Population | Importance for Jane Doe | Attribute Values for Jane Doe |
|---|---|---|---|
| Years in business, Tenure | 20.5% | 21.7% | Client has been in business since at least 3 years, but not more than 5 years. They have been a small business client since not more than 1 year |
| Industry classification | 5.7% | 6% | The client is a logistics based company |
| Days since open date of last account of client | 14.6% | 15.4% | The last account of the client was opened less than 20 days prior to the date of prediction |
| Check deposit transactions | 12% | 13.7% | The client has had 2 lesser number of check deposits compared to the month prior to the observation month |
| P2P purchase transactions | 12.9% | 13.3% | The client has had 1 more P2P purchase in the observation month compared to the previous month |
| Number of retail accounts associated with business account | 6% | 6.9% | The client's business account is associated with two retail accounts, indicating that there are likely 2 co-owners for the business |
| Days since open date of first account | 16.5% | 17.1% | The first account with the bank was opened between 30-90 days prior to the date of prediction |
| Risk rating | 4.4% | 5% | Risk changes from NULL in Feb 2017 to 3+ in March 2017 |
| Authorized credit balance | <0.1% | <0.1% | The authorized credit balance for the client is greater than $1M |

FACILITATING EXTRACTION OF INDIVIDUAL CUSTOMER LEVEL RATIONALES UTILIZING DEEP LEARNING NEURAL NETWORKS COUPLED WITH INTERPRETABILITY-ORIENTED FEATURE ENGINEERING AND POST-PROCESSING

BACKGROUND

The subject disclosure relates to extraction of rationales for studied outcome for each individual customer by leveraging a variety of customer data and using structured deep learning decomposable model neural networks coupled with interpretability-oriented feature engineering and post-processing based on the extracted rationales.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate extraction of rationales for studied outcome for each individual customer by leveraging a variety of customer data and using structured deep learning decomposable model neural networks coupled with interpretability-oriented feature engineering and post-processing based on the rationales.

According to an embodiment, a system is provided. The system can comprise: a memory that stores computer executable components; a processor that executes computer executable components stored in the memory, wherein the computer executable components comprise a feature repurpose component that generates interpretable features using operating rules, combining statistical dependence analysis to bin the selected features to align with favorite practice actions; and a grouping component that groups features as expert and that combines a subset of the interpretable features to align with a set of operating practices. The computer executable components also comprise: a neural network or deep learning component that quantifies contribution of respective experts at a consumer level applying a generic additive approach; a first post-processing component that extracts feature importance at an individual consumer-level; and a second post-processing component that evaluates alternative, what-if, scenarios through sensitivity analysis. The computer executable components can also comprise: an execution component that consolidates a subset of the practice actions at client or stakeholder levels; and a task assignment component that routes respective practice actions as a function of responsibility for the set of operating practices based on the outcomes of the first post-processing component and the second post-processing components.

According to another embodiment, a computer-implemented method is provided. The computer-implemented method comprises employing a processor and memory to execute computer executable components to perform the following acts: generating interpretable features using operating rules, combining with statistical dependence analysis to bin the selected features to generate favorite practice actions; grouping features as expert that combine a subset of the interpretable features to align with a set of operating practices; The acts can also comprise: using a neural network or deep learning component to quantify contribution of respective experts at a consumer level applying a generic additive approach; extracting feature importance at an individual consumer-level decomposed from expert level importance; evaluating alternative, what-if, scenarios through sensitivity analysis to identify favorite practice actions; consolidating a subset of the practice actions at client or stakeholder levels; and routing respective practice actions as a function of responsibility for the set of operating practices to stakeholders or consumers.

According to another embodiment, a computer program product wherein input variables are fed as an array of hyper parameters tuned using at least one of: learning rate, number of hidden nodes per expert, L1 regularization penalty, sparse attention penalty or dropout keep fraction; and hyper parameter selection is performed with a refined grid for learning rate after fitting hidden node size, using a validation set.

According to another embodiment, a computer program product comprising a computer readable storage medium having program instructions embodied therewith is provided. The program instructions are executable by processor to cause the processor to: generate interpretable features using operating rules, combine with statistical dependence analysis to bin selected features to generate favorite practice actions; group features as expert that combine a subset of the interpretable features to align with a set of operating practices; and use a neural network or deep learning component to quantify contribution of respective experts at a consumer level applying a generic additive approach. The program instructions are also executable by the processor to cause the processor to: extract feature importance at an individual consumer-level decomposed from expert level importance; evaluate alternative, what-if, scenarios through sensitivity analysis to identify favorite practice actions; consolidate a subset of the practice actions at client or stakeholder levels; and route respective practice actions as a function of responsibility for the set of operating practices to stakeholders or consumers.

BRIEF DESCRIPTION OF THE DRAWINGS

FIG. 5 illustrates an example of the detailed output one or more of the embodiments of the invention can provide in accordance with one or more embodiments described herein.

DETAILED DESCRIPTION

Figure 1:
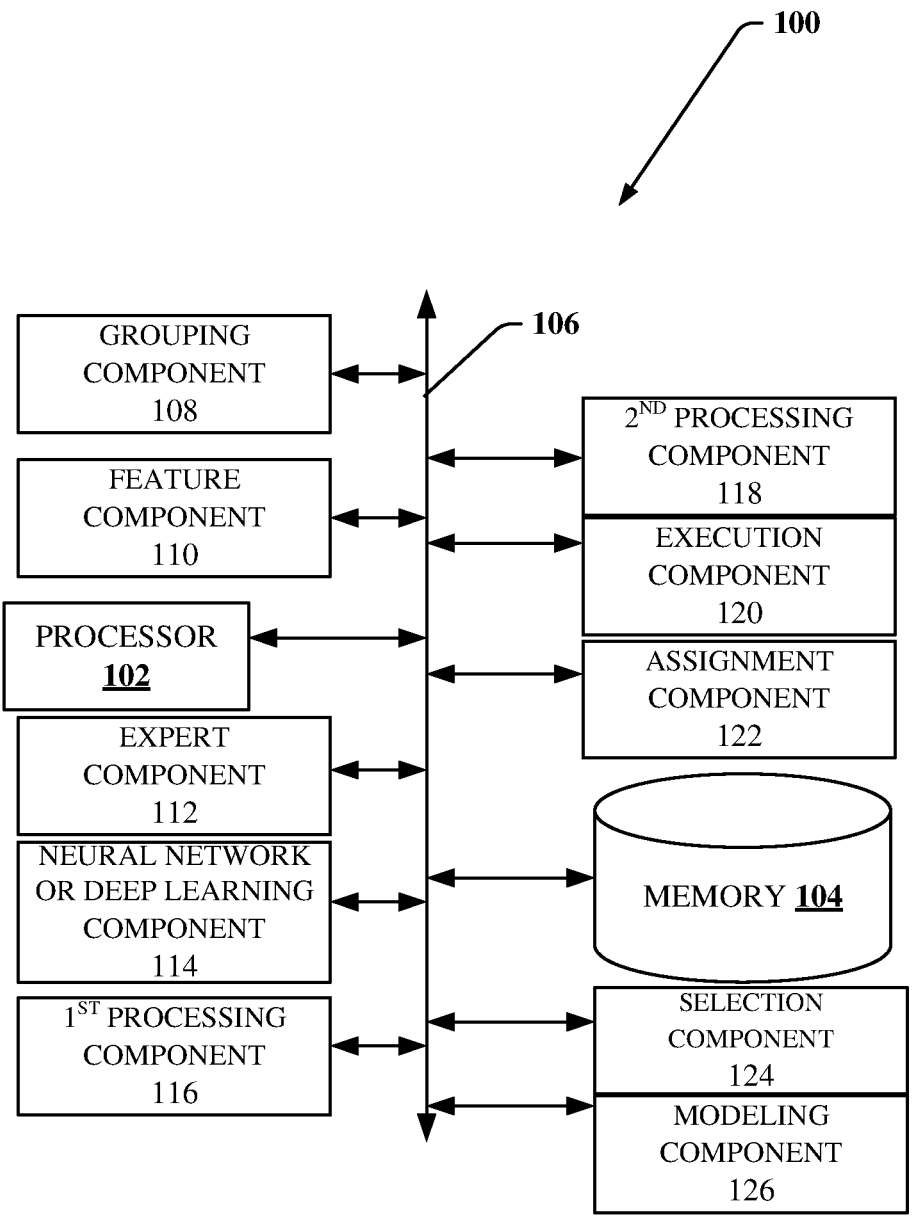
FIG. 1 illustrates a block diagram of an example system that can access and process data using variable computing components depicted in accordance with one or more embodiments described herein.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Currently there are various methods utilized to analyze and predict customer behavior to better support the clients and create potential revenue based on predictive outcomes. Companies assemble rich data repositories to enable client insights, log client account data, transaction data, e-mail and conversation transcripts. However, current predictive models are not designed to provide the rationales of the studied outcome from the influential factors and limited use of data with no clear interpretable output. Such predictive model limits its ability to provide next step action in practice to improve the business performance, such as increasing revenue and improve customer satisfaction. Therefore, there is a need to have a predictive mode can provide additional functionality that can quantify the rationales in a decomposable approach to separate the influence of the factors for each individual customer.

One or more embodiments described herein provides an end-to-end process-driven system to identify critical drivers for one or more individuals or entities (e.g., customer, client, one or more entities etc.) for a certain type of an outcome (e.g., financial or technical), and recommend actions based on these drivers. One or more embodiments can predict the outcome and extract individual-level rationales, or reasons associated with or underlying the predicted outcome. For example, one or more embodiments can identify that a certain one or more entities is likely to close his/her account because of certain characteristics such as his profile, transactional behavior, interactions with the bank, past behavior to marketing efforts, new types of accounts opened with the bank, risk profile etc. Accordingly, one or more embodiments can include a deep neural network-based system that can quantify the contribution of one or more expert networks (a single layer neural network representing an input attribute) at one or more individual customer levels. One or more embodiments can be generic and therefore applicable to many different areas. While the terms "individual," "user" and "customer" are used herein, it is envisaged that one or more embodiments can also apply to prediction for any number of different types of non-human entities, including, but not limited to, organizations, machines or the like and all such embodiments are envisaged albeit the term "individual," "user" or "customer" may be employed herein.

One or more embodiments of the invention can employ an expert generation utilization module to create a desired experts as the inputs for deep learning model. To cope with the varied forms of data from same kind of use cases, the expert generate module first encapsulates the details of the features to abstract into expert level. Such expert concept aligns with the high level of features, such as profile, transactional marketing actions, and feedback (from conversation transcripts). Another advantage of having this module is to create standard expert definitions for given type of applications. The standardization can help us to benchmark the important influential factors for a given type of application. It also provides the guideline on data harvesting on collecting the most influential factors for given experts.

The module adjusts to different use cases (e.g., Churn, Personalization, Event Prediction and Customer Segmentation) to allow us to incorporate different application with minimal work. This interpretable deep learning model can provide descriptive capability that conveys exactly how much one or more factors contributes to prediction. The model also can analyze how interesting one or more individual influential factors are and explicitly ignore unimportant signals Overall one or more embodiments of the invention can produce accurate predictions along with the interpretable factor contribution to outcome, is flexible enough to process various types of data and use cases and delivers business insights for each customer/client that can provide an interpretable foundation for the prediction.

One or more embodiments of the invention focuses on a deep learning model that is focused on flexible data input acceptance, flexible use case capability, superior performance to current models and the key novelty of individual level interpretability. Interpretability from the use of this model provides outcomes decomposable into individual expert or even feature contribution. The data outcome should be interpretable in many forms such as, the data should be informative to the one or more entities of the model, have causal value, be measurable, be robust and provide controllability.

Interpretability can have many challenges such as vague evidence for predictions and superficial causality, and linear models can be subject to covariate effects through the process of feature selection. One or more embodiments of the invention can be a system that consumes a combination of customer demographic, customer behavioral and business controllable features and employs several layers of processing and modeling, outputs individual customer-level rationales and business actions to attain a certain business objective. The system has multiple inputs such as business controllable data, customer profile features and customer behavioral data. This data is processed through various computing modules within the system to produce the outcome. The input data is first subject to pre-processing, univariate analysis and feature binning. Then the system groups the interpretable features and applies expert neural network layers that can filter out noise and provide cleaner linear relationship data, which is then processed through the decomposable model to derive individual level feature importance and individual level feature contribution. The system concludes by processing the data through a what-if sensitivity analysis for the final resulting outcome.

The innovation can be implemented over a distributed network architecture to offload computing power required over various processing devices. This sliced workload process can assist in producing rapid results above conventional single processor or threaded architectures.

FIG. 1 illustrates a block diagram of an example system that can access and process data using variable computing components depicted in accordance with one or more embodiments described herein. The system 100 can facilitate a process of assessing and identifying a large amount of various forms of data, and using machine learning, train a neural network or other type of model. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components.

In some embodiments, the components can be computer executable components and can include, but are not limited to, a grouping component 108, a feature repurpose component 110, an expert network component 112, a neural network or deep learning component 114, a first post-processing component 116, a second post-processing component 118, an execution component 120, a task assignment component 122, a selection component 124 and a modeling component 126. The computer executable components can be communicatively and/or operably coupled to one or more of the other computer executable components in various embodiments.

The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any hardware or software implementation that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 104 can store computer executable components executable by the processor 102. In some embodiments, the grouping component 108 can group features as expert to align with a set of operating practices. For example, in the TV marketing scenario, the operating practices includes a) the time (including the decision of weekday, weekend, hour, and time interval, and the frequencies) to market a goods on TV, and the targeted clients for sending the promotion and ask for feedbacks. To achieve that, we need to create three experts. One is designed for the TV marketing, including the time, interval, cost of the advertisement, etc. to reflect that impact on the potential sell, and second expert is designed for e-mail marketing, including the label of targeted clients, frequency of e-mail sent for certain goods and its promotion. Third expert is designed as the client profile, it reflects more generic information of the clients, such as orientation, age range, historical purchase frequency, and favorite good products, and so on.

One or more embodiments can also generate decomposable relationship experts as groups of input feature and outcome, the decomposable relationship experts are formed as a hierarchical structure. The higher level reflects the more abstract experts, and the lower level reflects the lower level of experts. Much of the decomposable relationship experts can be reusable within same industry sector. In some embodiments, the outcome can be a summation of contributions from experts employing attention modeling. The interpretable features can be a function of capability of additive reasoning with respect to groups of input features. As shown in FIG. 5, the importance of each feature (or factor) on a small business VISA purchase has been broken into the ratios for each factor level.

The feature repurpose component 110 can generate interpretable features using operating rules, such as methods of categorization of certain clients, or certain goods in retail industries, and combining statistical dependence analysis to bin the selected features to generate favorite practice actions, such as marketing or attrition reduction practices Also, the feature repurpose component focuses on features that are respectively above a defined threshold of classification or predictability, such as AUC (area under curve for binary classification) or MSE (mean square error) for prediction employs univariate analysis to identify statistical significant features to an outcome, and statistical causality analysis to identify relationship of the features. The importance of interpretability come from the understanding the reason a deep learning model provide certain prediction or decision. As machine learning becomes more and more important in our life, a simple prediction or decision (such as classification) accuracy is not enough. In the context of this invention, interpretability is the ability of the model outcome can be explained to a person without machine learning and analytic background.

The expert component 112 can combine a subset of the interpretable features wherein one or more expert networks represents an input feature or group of input features. The neural network or deep learning component 114 can quantify the contribution of respective experts at a consumer level applying a generic additive approach, and the neural network or deep learning component 114 can employ attention modeling where an expert network is a multiple layer neural network with the separation of experts as inputs features with final contribution as linear contributions from experts. Different from outcome from linear or logic regression, where there is also a linear combination of the contributions, but such linear coefficient is constant, we have the linear combination be client specific, i.e. that contribution is different from client to client (FIG. 5).

The first post-processing component 116 can extract feature importance as the sensibility of the feature on final outcome at an individual consumer-level, decomposed from expert level importance, coming from the coefficient of the expert of the linear combination, while the second post-processing component 118 evaluates alternative, what-if, scenarios through sensitivity analysis to identify favorite practice actions.

The execution component 120 consolidates a subset of the practice actions at client or stakeholder levels. The task assignment component 122 routes respective practice actions as a function of responsibility for the set of operating practices to stakeholders or consumers.

The selection component 124 selects a subset of the features based on statistical significance on outcome to identify reasons of targeted outcome as three steps of selection. The first step is to choose the features can be easy understood and harvested, the second step is the univariate analysis to analyze the significance of the features on the outcome and select those important. The third step is a greedy approach to remove the duplicated features in term of additional information contributed. This embodiment factors socioeconomic characteristics of a consumer including at least one but not limited to: age, orientation, education level, income level, marital status, occupation, birth rate, mortality rate, average size of a family, location of living, etc.

The modeling component 126 models consumer-initiated activities as time-dependent events and analyzes time sequence causality and statistical significance to facilitate understanding consumer behaviors on outcome. Any of these individual components can overlap functionality into any other components.

Any suitable predictive model can be employed such as for example: a logistical regression model; a Bayesian network; a neural network; hidden Markov model (HMM); or a support vector machine (SVM).

The various components (e.g. grouping component 108, feature repurpose component 110, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art. Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Figure 2:
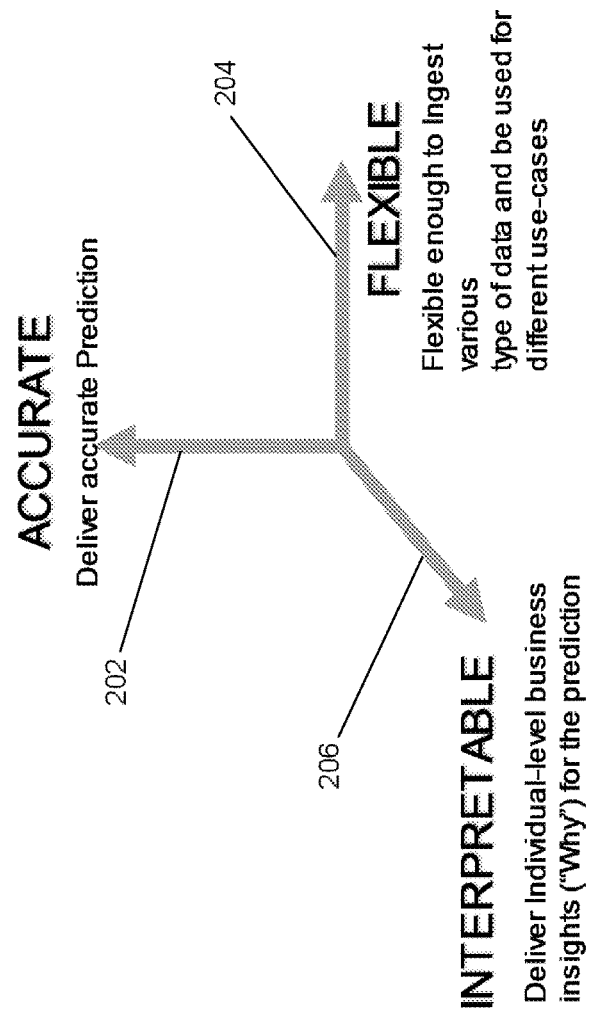
FIG. 2 illustrates the objectives achieved in accordance with one or more embodiments described herein.

FIG. 2 illustrates the objectives achieved in accordance with one or more embodiments described herein. In some embodiments, the objectives of one or more embodiments of this invention can be achieved and should be met at an individual level 202, flexible enough to handle various forms of data and use cases 204, and interpret individual level insights such as the reason why a particular event occurred.

Figure 3:
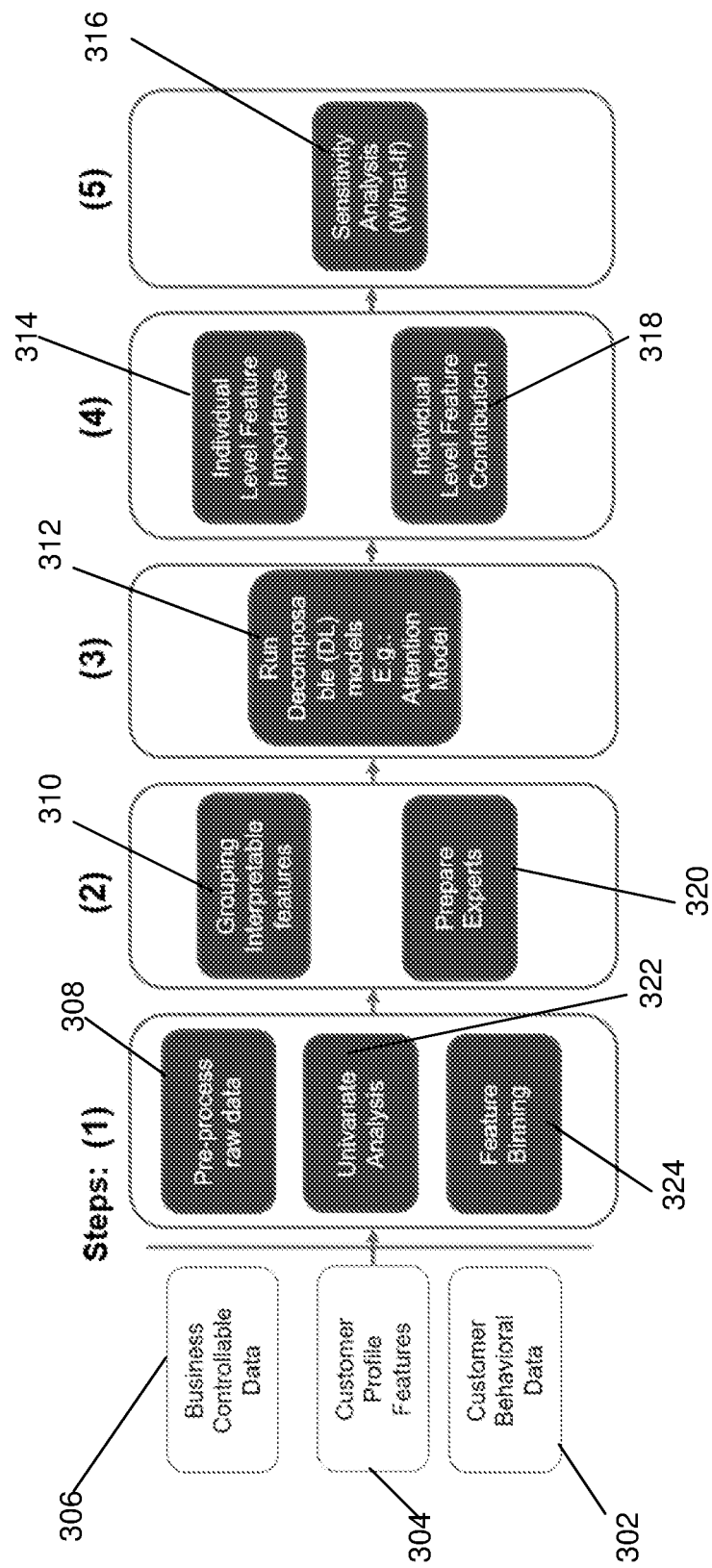
FIG. 3 illustrates the system architecture for the deep learning platform in accordance with one or more embodiments described herein.

FIG. 3 illustrates the system architecture for the deep learning platform in accordance with one or more embodiments described herein. Customer data such as behaviors 302 and profiles 304 along with business controllable data 306 are the inputs into the system. Those controllable data could be human created events, such as marketing phone call, briefing meeting and in person visit, or more commonly a machine generated events, such as e-mail, Customer behaviors are customer-initiated activities, which typically can be modeled as a time-dependent events, typically, those activities are associated with outcome of the interpretable deep learning model. We apply the statistically approaches, such as mean, standard deviation, change frequency, and wavelets analysis to extract the features from the activities. Analyzing the time sequence causality and its statistical significance is performed through the univariate analysis to help to understand customer behaviors on the business outcome. Customer profiles are socioeconomic characteristics of the customer, such as age, orientation, education level, income level, marital status, occupation, beliefs, birth rate, mortality rate, average size of a family Business controllable features are features controlled by business owners, and the change of the features is the leverage to influence outcome.

Pre-processing of data occurs in 308 and univariate analysis in 322. Binning the selected features 324 allows three major benefits, the binning approach can be selected from a decision tree approach or simply input from the business practice, to aggregate the inputs into a more interpretable features, example such as the income, age ranges and geographic area: ease of explanation as there are clear input feature boundaries, ease of generation of interpretable population segments and assistance in later application into business decisions to introduce what-if conditions.

The grouping component 310 groups features as expert 320 to align with a set of operating practices. The process 312 can comprise running a deep learning neural network decomposable model such as the Baseline Modeling Approach (Logistic Regression provides ordered feature importance at customer level), the One Step Modeling Approach (Attention Model provides the numerical contribution of one or more experts at a customer level) or the Two Step Model (knowledge distillation: Teacher/Student model, depending the student model used, provides the contribution features). The post-processing functions are executed in 314 and 318. These can be software modules that generate the selected customer population based on the model outcome (e.g. selection of the customer population of buying certain product in the next time horizon with a reasonable propensity. They can generate ranking of the importance of features (1st, 2nd, 3rd, . . . ) to the selected population based on the individual contribution of input features. They can generate the numerical importance of features and identify the business controllable features for individual customer. The last process of sensitivity analysis in 316, where what-if scenarios are incorporated into output decisions. The importance of the features is determined through the changes of the outcomes by applying different controllable actions using the generated interpretable deep learning model.

Figure 4:
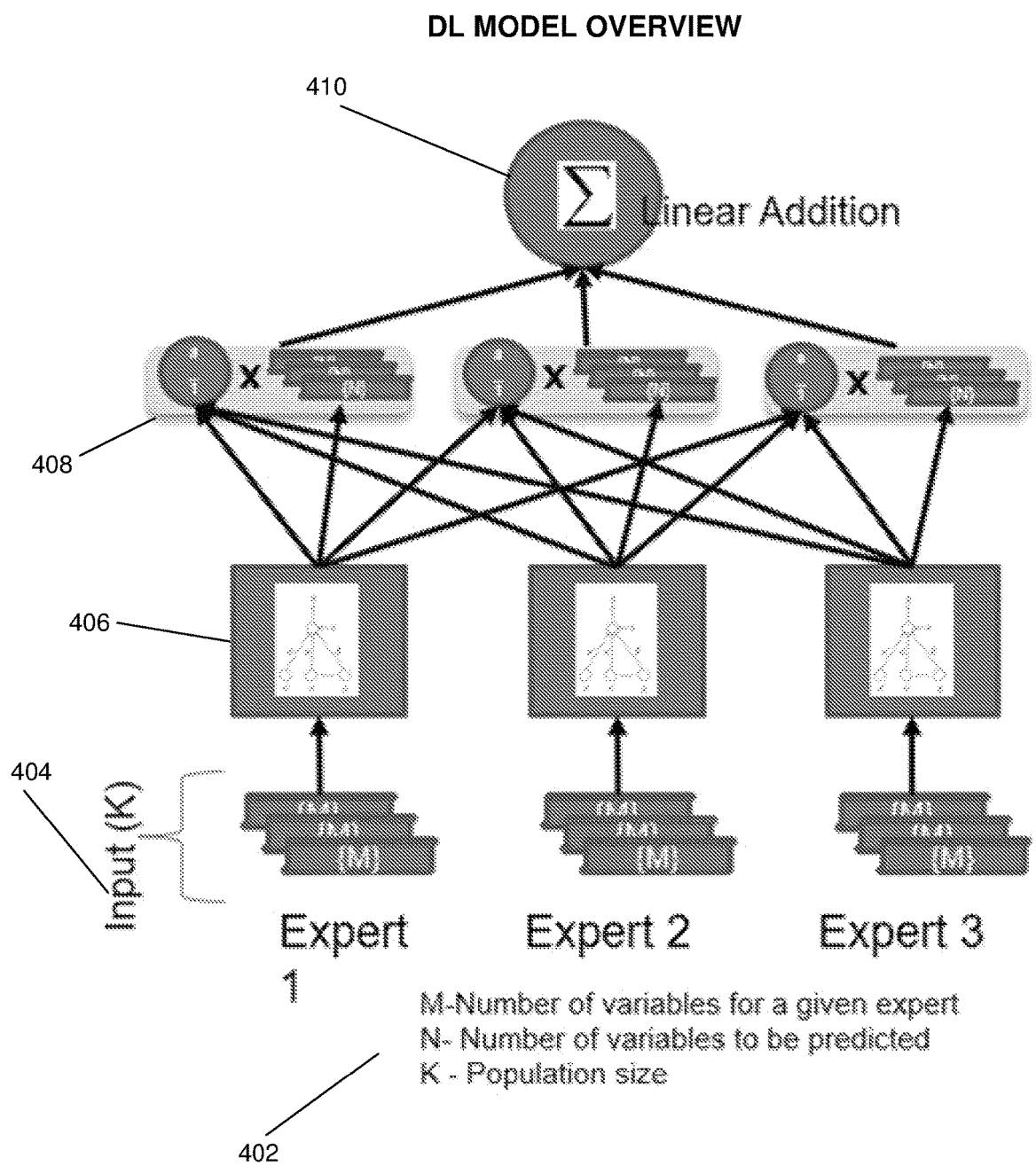
FIG. 4 illustrates on overview of the interpretable deep learning model in accordance with one or more embodiments described herein.

FIG. 4 illustrates on overview of the interpretable deep learning model in accordance with one or more embodiments described herein. For example, FIG. 4. illustrates the DL Attention Model Overview. The number of variables 402 are used by the expert network 404. The expert network 404 is a single layer neural network and the gating network uses a smooth soft attention function. One or more expert network represents an input attribute or group of input attributes and the interpretability comes from its capability of additive reasoning with respect to groups of input features— the contribution of this expert contribution comes from the value of this experts. Input variables are fed as arrays into the expert network then further internal process as utilizing decision trees 406, additional layers on networks 408 and summary linear additions 410 are performed. This is basic data process flow for the method processing.

FIG. 5 illustrates an example of the detailed output one or more of the embodiments of the invention can provide in accordance with one or more embodiments described herein. For example, FIG. 5. illustrates the detailed level of individual predictive output that this system can provide. Individual specific information 504 can be compared to the average population 502. In this case the system produced very specific predictive behavior for Jane Doe.

Figure 6:
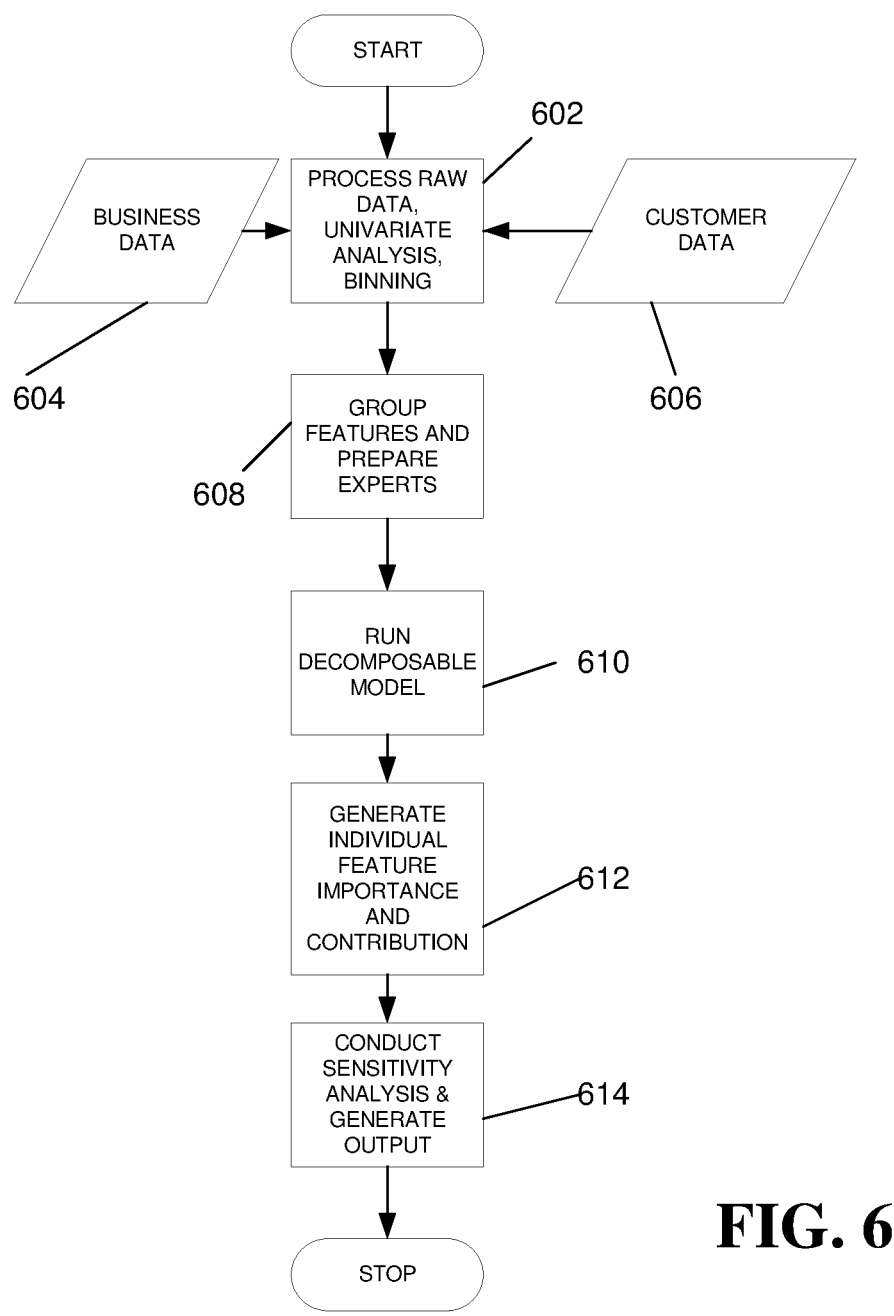
FIG. 6 illustrates a flowchart of a computer-implemented method in accordance with one or more embodiments described herein.

FIG. 6 illustrates a flowchart of a computer-implemented method in accordance with one or more embodiments described herein. For example, FIG. 6 illustrates the process flowchart for extracting rationales for studied outcome for each individual customer to help drive business decisions. As discussed previously the business data 604 and customer data 606 are the inputs into the system. The next step is 602 which processes raw data and conducts univariate analysis and binning Grouping features and preparing the expert networks are next as shown in 608. The DL model is run with the data in 610 and this generates individual importance and contribution 612. The end of the process 614 handles sensitivity analysis with "what-if" scenarios and generates a detailed individual based output. individual data structure processing blocks or programming categories portrayed within a data flow.

Figure 7:
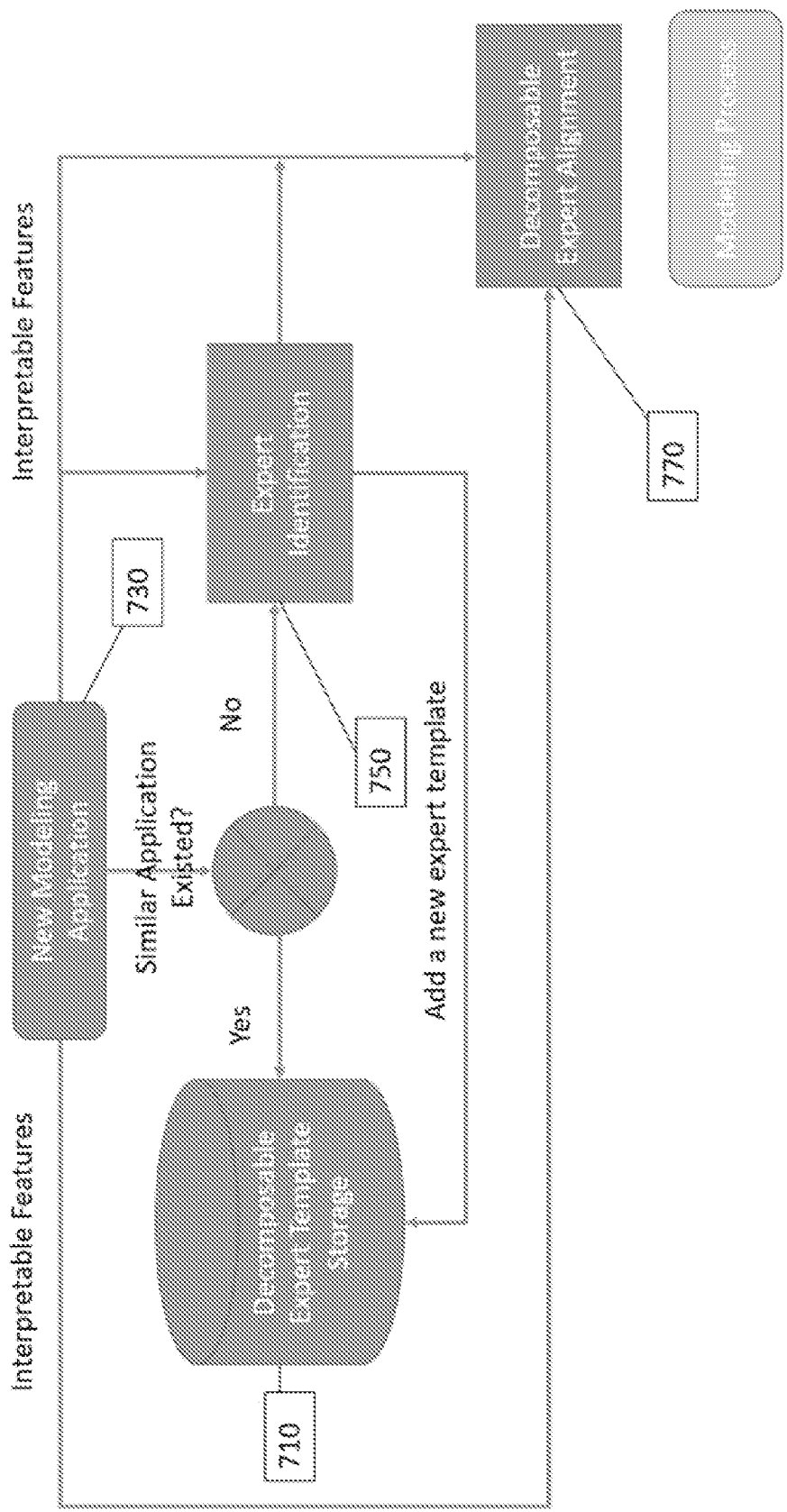
FIG. 7 illustrates the data flow of an expert generation and utilization module

FIG. 7 illustrates an expert generation and utilization module with one or more embodiments described herein. The module adjusts to different use cases (e.g., Churn, Personalization, Event Prediction and Customer Segmentation) in different industries (e.g. retail, financial and education) to allow to incorporate different applications with minimal work by reuse of what experts identified and created prior. For any suitable application 730, first a Decomposable Expert Template Storage 710 is utilized. If a template is identified, then we interpretable features are aligned to each corresponding expert. Alignment is completed by mapping processed interpretable features to a different expert 770. If there is no pre-existed expert template in storage 710, an expert identification process 750 is performed, and an identified template is saved in the storage 710. Then, the processed interpretable features are aligned to the different expert 770.

Figure 8:
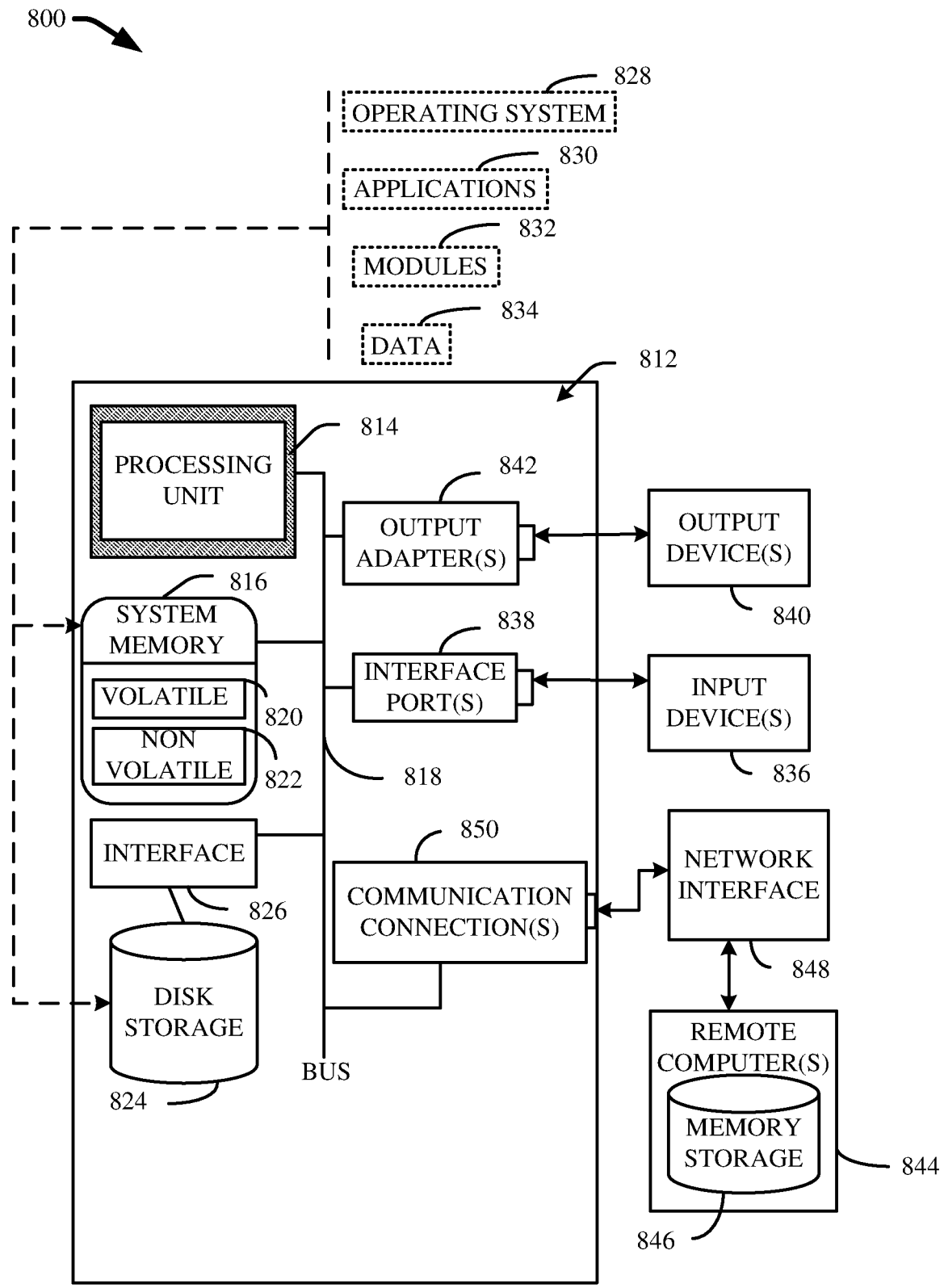
FIG. 8 is a schematic diagram of an example operating environment in accordance with one or more embodiments described herein.

To provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

A suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/nonvolatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 7 also depicts software that acts as an intermediary between users and the basic computer resources described in the suitable operating environment 801. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor-based appliance, a peer device or other common network node and the like, and typically can also include many or all the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the hide description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
     a feature repurpose component that generates interpretable features using operating rules, combining statistical dependence analysis to bin selected features to generate practice actions based on various forms of data;
     a grouping component that groups features as expert networks and that combines a subset of the interpretable features to align with a set of operating practices;
     an expert component that combines a subset of the interpretable features wherein one or more expert networks represents an input feature or group of interpretable features;
     a neural network or deep learning component that trains a deep learning neural network to quantify contribution of respective individual expert networks at a consumer level;
     a first post-processing component that extracts, using the deep learning neural network, feature importance at an individual consumer-level as a sensibility of a feature on a final outcome;
     a second post-processing component that evaluates alternative, what-if, scenarios through sensitivity analysis associated with changing outcomes by applying, using the deep learning neural network, different controllable actions;
     an execution component that consolidates a subset of the practice actions at client or stakeholder levels; and
     a task assignment component that routes respective practice actions as a function of responsibility for the set of operating practices based on outcomes of the first post-processing component and the second post-processing component.

2. The system of claim 1, further comprising a selection component that selects a subset of the features based on statistical significance on outcome to identify reasons of targeted outcome, applying a univariate analysis, and removing duplicated features by a greedy approach.

3. The system of claim 2, further comprising a modeling component that models consumer-initiated activities as time-dependent events, and analyzes time sequence causality and statistical significance to facilitate understanding consumer behaviors on outcome.

4. The system of claim 2, wherein the selection component factors socioeconomic characteristics of a consumer including at least one of: age, orientation, education level, income level, marital status, occupation, birth rate, mortality rate, average size of a family, location of living.

5. The system of claim 1, wherein the feature repurpose component focuses on features that are respectively above a defined threshold of classification or predictability, employs univariate analysis to identify statistically significant features to an outcome, and statistical causality analysis to identify relationship of the features.

6. The system of claim 1, wherein the system generates decomposable relationship experts as groups of input feature and outcome, wherein the outcome is a summation of contribution from expert networks as attention modeling, and wherein the interpretable features are respectively a function of capability of additive reasoning with respect to groups of input features.

7. The system of claim 1, wherein the deep learning neural network employs attention modeling where an expert network is a multiple layers neural network with separation of expert networks as inputs features with final contribution as a linear contributions from expert networks.

8. The system of claim 7, wherein one or more expert networks represent an input feature or group of input features.

9. A computer-implemented method, comprising employing a processor and memory to execute computer executable components to perform the following acts:
   generating interpretable features using operating rules, combining with statistical dependence analysis to bin selected features to generate practice actions based on various forms of data;
   grouping features as expert networks that combine a subset of the interpretable features to align with a set of operating practices;

training a deep learning neural network to quantify contribution of respective individual expert networks at a consumer level;

extracting, using the deep learning neural network, feature importance at an individual consumer-level decomposed from expert level importance as a sensibility of a feature on final outcome;

evaluating alternative, what-if, scenarios through sensitivity analysis associated with changing outcomes by applying, using the deep learning neural network, different controllable actions;

consolidating a subset of the practice actions at client or stakeholder levels; and routing respective practice actions as a function of responsibility for the set of operating practices to stakeholders or consumers.

10. The computer-implemented method of claim 9, further comprising selecting a subset of the features based on statistical significance on outcome to identify reasons of targeted outcome by choosing features that can be easily understood and harvested, applying a univariate analysis, and removing duplicated features by a greedy approach.

11. The computer-implemented method of claim 9, further comprising modeling consumer-initiated activities as time-dependent events and analyzing time sequence causality and statistical significance to facilitate understanding consumer behaviors on an outcome.

12. The computer-implemented method of claim 9, wherein a selection component factors socioeconomic characteristics of a consumer including at least one of: age, orientation, education level, income level, marital status, occupation, birth rate, mortality rate, average size of a family, location of living.

13. The computer-implemented method of claim 9, further comprising focusing on features that are respectively above a defined threshold of classification or predictability, employing univariate analysis to identify statistically significant features to an outcome, and performing statistical causality analysis to identify a relationship of the features.

14. The computer-implemented method of claim 9, further comprising generating decomposable relationship experts as groups of input feature and outcome, wherein the outcome is a summation of contribution from expert networks as attention modeling, and wherein the interpretable features are respectively a function of capability of additive reasoning with respect to groups of input features.

15. The computer-implemented method of claim 9, further comprising employing attention modeling where an expert network is a multiple layers neural network with separation of expert networks as inputs features with final contribution as a linear contribution from expert networks.

16. The computer-implemented method of claim 15, wherein an expert network represents an input feature or group of input features.

17. The computer-implemented method of claim 9, wherein input variables are fed as an array of arrays, hyper parameters are tuned using at least one of: learning rate, number of hidden nodes per expert network, L1 regularization penalty, sparse attention penalty or dropout keep fraction; and hyper parameter selection is done with a refined grid for learning rate after fitting hidden node size, using a validation set.

18. A computer program product comprising a non-transitory computer readable storage medium having program instructions embodied therewith, the program instructions executable by processor to cause the processor to:

generate interpretable features using operating rules, combine with statistical dependence analysis to bin selected features to generate practice actions;

group features as expert networks that combine a subset of the interpretable features to align with a set of operating practices;

training a deep learning neural network to quantify contribution of respective individual expert networks at a consumer level;

extract, using the deep learning neural network, feature importance at an individual consumer-level decomposed from expert level importance as a sensibility of a feature on a final outcome;

evaluate alternative, what-if, scenarios through sensitivity analysis associated with changing outcomes by applying, using the deep learning neural network, different controllable actions;

consolidate a subset of the practice actions at client or stakeholder levels; and route respective practice actions as a function of responsibility for the set of operating practices to stakeholders or consumers.

19. The computer program product of claim 18, further comprising program instructions executable by processor to cause the processor to:

select a subset of the features based on statistical significance on outcome to identify reasons of targeted outcome by choosing features that can be easily understood and harvested, applying a univariate analysis, and removing duplicated features by a greedy approach; and model consumer-initiated activities as time-dependent events, and analyzes time sequence causality and statistical significance to facilitate understanding consumer behaviors on the outcome.

20. The computer program product of claim 18, further comprising program instructions executable by processor to cause the processor to:

process data through various computing models within the system to produce the final outcome.

* * * * *